United States Patent [19]

Boehm

[11] 4,450,688
[45] May 29, 1984

[54] BRAKE BOOSTER FOR AUTOMOTIVE VEHICLES

[75] Inventor: Peter Boehm, Frankfurt am Main, Fed. Rep. of Germany

[73] Assignee: ITT Industries, Inc., New York, N.Y.

[21] Appl. No.: 270,077

[22] Filed: Jun. 3, 1981

[30] Foreign Application Priority Data

Jul. 4, 1980 [DE] Fed. Rep. of Germany ....... 3025314

[51] Int. Cl.³ ................... B60T 13/20; F01B 19/04; F15B 9/10
[52] U.S. Cl. ................... 60/554; 60/547.1; 91/369 A; 92/98 D
[58] Field of Search ............ 91/369 R, 369 A, 369 B, 91/376 R; 92/98 R, 98 D, 99, 165 R, 165 PR; 60/554, 547.1

[56] References Cited

U.S. PATENT DOCUMENTS 3,033,173 5/1962 Bauman ..................... 91/369 B
4,307,570 12/1981 Yardley ..................... 60/547.1

FOREIGN PATENT DOCUMENTS 2053395 2/1981 United Kingdom ............... 60/547.1

Primary Examiner—Robert E. Garrett
Assistant Examiner—Abram M. Bradley
Attorney, Agent, or Firm—James B. Raden; Marvin M. Chaban

[57] ABSTRACT

A brake booster for automotive vehicles comprises a low-pressure casing sealingly subdivided into a low-pressure chamber and a working chamber by an axially movable wall. The two transverse end walls of the low-pressure casing are interconnected by a central reinforcement tube integrally formed with a master cylinder. The actuating piston of the master cylinder is connected to a guide piston which is guided in the reinforcement tube and which receives a rubber-elastic reaction disc in an end thereof remote from the master cylinder. A control valve casing is axially movable in the reinforcement tube, bears axially against the reaction disc and is connected to the movable wall by radial ribs extending radially through longitudinal slots in the reinforcement tube. The radial ribs are connected to a ring which encompasses the reinforcement tube and which is secured in a bowl-shaped hub member of the movable wall. Air channels extend through the radial ribs to connect a control valve in the control valve casing to the low-pressure chamber.

16 Claims, 2 Drawing Figures

BRAKE BOOSTER FOR AUTOMOTIVE VEHICLES

BACKGROUND OF THE INVENTION

The present invention relates to a brake booster for automotive vehicles comprising a low-pressure casing sealingly subdivided into a low-pressure chamber and a working chamber by an axially movable wall, a reinforcement tube extending axially through the low-pressure casing and connecting the two transverse end walls of the low-pressure casing, a seal abutting the reinforcement connected to the movable wall, and a mechanically actuatable control valve to connect the working chamber to the low-pressure chamber or to atmosphere. The control valve casing of the control valve is axially movable in the reinforcement tube, is in communication with an actuating piston of a master cylinder secured to the transverse end wall of the low-pressure casing adjacent the low-pressure chamber via a rubber-elastic reaction disc and is in communication with the movable wall via radial ribs which project through longitudinal slots of the reinforcement tube.

In brake boosters for automotive vehicles, it is desirable to obtain a light-weight construction as well as a minimum overall length. To enable the low-pressure casing to be of a lightest possible construction, the force which develops during brake actuation and which is transmitted from the master cylinder onto the point where the brake booster is fastened to the automotive vehicle, for example, to the splashboard, will no longer be transmitted via the low-pressure casing but rather via a central reinforcement tube according to more recent proposals. Since the control valve casing is arranged within the reinforcement tube and the axially movable wall is required to be urged into force-transmitting connection with the control casing, radial ribs will have to extend from the movable wall, which is guided outside the reinforcement tube, through longitudinal slots in the reinforcement tube to establish a connection with the control valve casing. Simultaneously, a movable seal will be necessary between the axially movable wall and the reinforcement tube.

In a brake booster of the type referred to hereinabove as disclosed in U.S. copending application of J. Belart and F. Wienecke, Ser. No. 061,113, filed July 26, 1979, assigned to the same assignee as the instant application, the reinforcement tube is constructed as a separate component which is connected to both transverse end walls of the low-pressure casing. The master cylinder is connected by a flange and bolts to one transverse end wall of the low-pressure casing. A push rod transmits the brake force generated by the brake booster from the reaction disc located in the control valve casing onto the actuating piston of the master cylinder. This push rod bears via a spherical surface against the master cylinder actuating piston. To obtain an adequate guide of the actuating piston in the master cylinder, the actuating piston and the master cylinder are required to be of sufficiently long construction, which results in a comparatively large overall length. Also the necessity for provision of an axially movable seal between the movable wall and the reinforcement tube, taking into consideration the longitudinal slots in the reinforcement tube, conditions a specific minimum overall length.

SUMMARY OF THE INVENTION

It is, therefore, an object of the present invention to provide a brake booster of the type referred to hereinabove having a simple construction, the smallest possible length and ease of manufacture. A feature of the present invention is the provision of a brake booster for automotive vehicles comprising: a low-pressure casing having a longitudinal axis and two spaced end walls in a transverse relationship with the axis, the casing being sealingly subdivided into a low-pressure chamber and a working chamber by an axially movable wall disposed coaxial of the axis; a reinforcement tube coaxial of the axis extending axially through the casing to interconnect the two end walls and in a slideable sealed relationship with the movable wall, the tube being integrally formed with a housing of a master cylinder having an actuating piston disposed coaxial of the axis and guided in the housing, the housing being secured to that one of the two ends walls adjacent the low-pressure chamber; a control valve casing disposed in the tube coaxial of the axis, the control valve casing being axially movable in the tube and including therein a mechanically actuatable control valve to connect the working chamber to a selected one of the low-pressure chamber and atmosphere; a guide piston disposed in the tube coaxial of the axis connected to the actuating piston, the guide piston being axially movable in the tube; an elastic reaction disc disposed in the tube coaxial of the axis between the control valve casing and the guide piston; and at least two spaced radial ribs each fastened to the control valve casing extending radially through a different one of at least two longitudinal slots of the tube to connect the control valve casing to the movable wall.

Because there is no need for connecting elements, such as connecting flanges, between the master cylinder and the reinforcement tube, on the one hand, a light-weight construction results, and, on the other hand, there is no necessity of arranging for a compensation of tolerances between the reaction disc and the master cylinder actuating piston, which has caused a considerable expenditure of work during assembly in the conventional method of construction incorporating a push rod.

The actuating piston in the master cylinder, which is the primary piston if the master cylinder is of tandem construction, is of a very short construction which also applies for the master cylinder's section receiving the actuating piston, since the guide for the actuating piston is simultaneously effected by the guide piston in the reinforcement tube which is spaced axially further from the actuating piston. Yet, an exact guiding of the actuating piston is guaranteed, since the two bores serving as the guide, i.e. the master cylinder bore and the guide bore in the reinforcement tube, are formed integrally. The reduction of the overall axial length in the area of the actuating piston in the master cylinder compensates the increase of overall length caused by the method of construction incorporating a central reinforcement tube, so that the advantages of the method of construction with a central reinforcement tube, i.e. in particular the light-weight construction achievable thereby, may be made use of without having to put up with an unwelcome increase of the overall length of the entire brake booster including the master cylinder.

In an embodiment of the present invention, the guide piston is of cup-like construction at its end close to the control valve casing for accommodation of the reaction disc. In this structure, the space which is available within the guide piston is utilized for accommodation of the reaction disc in a particularly space-saving manner, which is again a contribution to a reduction of the overall length. Besides, there is particular ease of assembly of the reaction disc at this point.

In an improvement of the present invention, a further simplification of the assembly and a reduction of the number of components required is accomplished in that the longitudinal slots are open at the end of the reinforcement tube close to the working chamber and in that the control valve casing communicates via the radial ribs with a ring which encompasses the reinforcement tube and to which the movable wall is sealingly attached. During the assembly, it will be only necessary to insert the constructional unit comprising the control valve casing, the radial ribs and the ring into the reinforcement tube.

It has proved to be expedient to provide the end of the reinforcement tube close to the working chamber with a thread and to engage this threaded tube end with a thread at the adjacent transverse end wall of the low-pressure casing. This does not only afford a fastening method simplifying the assembly but, simultaneously, ensures the cohesion of the reinforcement tube's end close to the working chamber which is subdivided by the longitudinal slots, so that there is no risk of the reinforcement tube being widened at this end, not even in the case of a particularly thin-walled and therefore light-weight construction.

A construction has been found to be particularly advantageous in which the end of the reinforcement tube close to the working chamber extends into a groove of the adjacent transverse end wall of the low-pressure casing, with this groove including the thread at one groove inner wall and a centering surface for the reinforcement tube at the opposite groove inner wall. A particularly good centering of the reinforcement tube's end is obtained thereby without the thread being required to serve for the centering.

In a further embodiment of the present invention, the ring communicating with the radial ribs is held by a sleeve in a bowl-shaped hub member of the movable wall, and the ring is sealed relative to the reinforcement tube by means of a rolling diaphragm which is supported on a cylindrical portion of the sleeve. This way, there is not only attained a simple connection between the movable wall and the ring which is appropriate for transmission of great forces but, at the same time, a particularly effective sealing between the movable wall and the reinforcement tube as well, with the number of components required being maintained low.

Favorably, air channels extend through the radial ribs which connect the control valve casing to the low-pressure chamber. This obviates the need for provision of separate components to connect the low-pressure chamber to the control valve casing.

In a still further embodiment of the present invention, the transverse casing end wall of the working chamber includes a central screw-on plate and an annular casing wall sealingly fastened thereto. The part of the low-pressure casing close to the working chamber being sectioned in such a manner permits, in one respect, to provide a solid and precisely machined component, i.e. the screw-on plate, for attachment of the reinforcement tube to the transverse casing end wall and for attachment of the low-pressure casing to the automotive vehicle, while the remaining part of the transverse end wall of the low-pressure casing can be made of a very light-weight material, for example, made of plastics.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
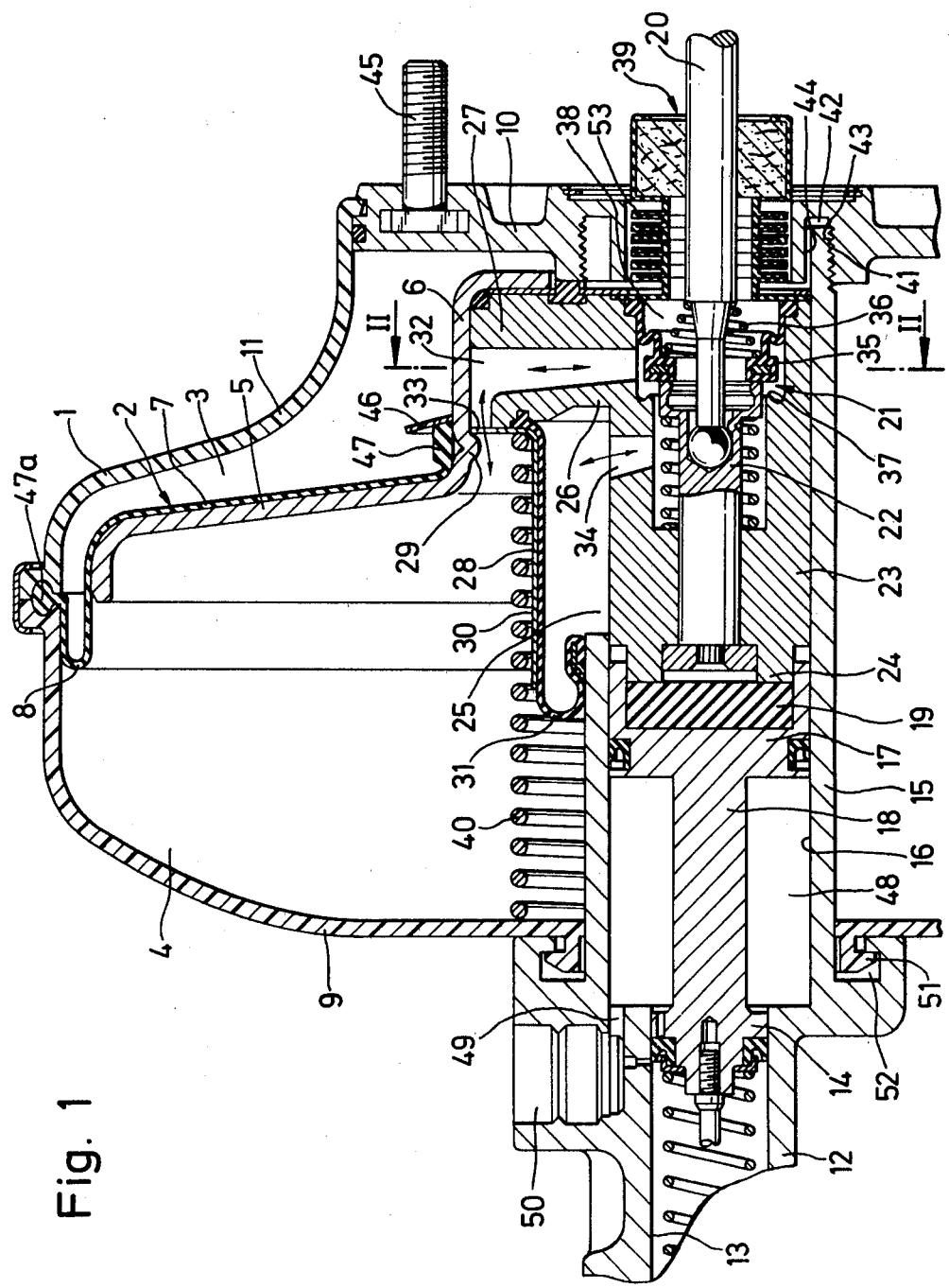
FIG. 1 is a longitudinal cross-sectional view of a brake booster with master cylinder in accordance with the principles of the present invention, with the lower portion of the low-pressure casing omitted, taken along line I—I of FIG. 2.
Figure 2:
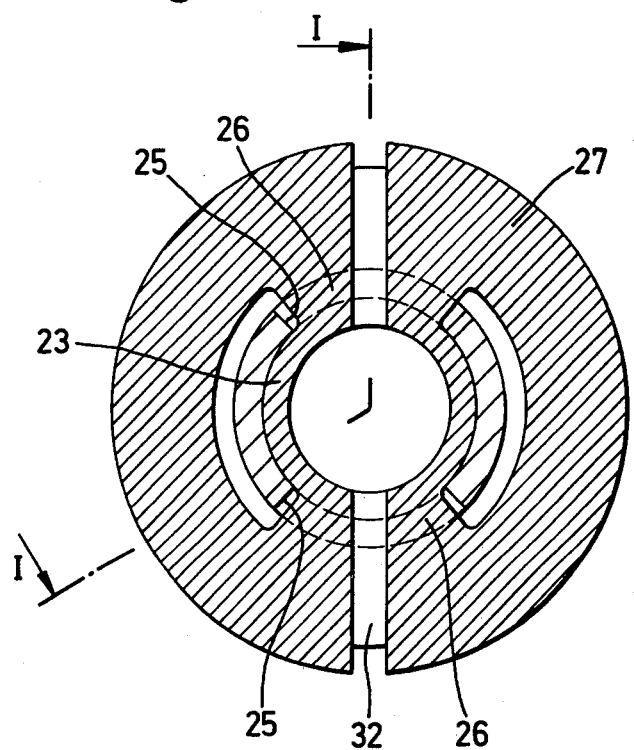
FIG. 2 is a cross-sectional view taken along the line II—II of FIG. 1.

Referring to FIGS. 1 and 2, the brake booster of the present invention includes a low-pressure casing 1 which is subdivided into a working chamber 3 and a low-pressure chamber 4 by an axially movable wall 2. The axially movable wall 2 includes a diaphragm plate 5 including a bowl-shaped hub member 6 and a flexible diaphragm 7 abutting diaphragm plate 5 and forming a rolling diaphragm 8 as a movable seal in the area between the outer circumference of diaphragm plate 5 and the peripheral wall of low-pressure casing 1.

A transverse end wall 9 of low-pressure casing 1 close to low-pressure chamber 4 is formed by a plastic shell. A transverse end wall of low-pressure casing 1 close to working chamber 3 includes a central screw-on plate 10 and an annular casing wall 11 made of plastics and sealingly fastened to the periphery of screw-on plate 10.

Fitted to end wall 9 of low-pressure casing 1 close to low-pressure chamber 4 is a master cylinder 12 of the brake unit of an automotive vehicle, which cylinder is only partly shown in FIG. 1. Guided in a master cylinder bore 13 of master cylinder 12 is an actuating piston 14 which forms the primary piston if master cylinder 12 is of tandem construction.

A cylindrical extension of the casing of master cylinder 12 forms a reinforcement tube 15, which extends axially through low-pressure casing 1 and whose free end is screwed to screw-on plate 10. Sealingly guided in a guide bore 16 of reinforcement tube 15 is a guide piston 17 which is via a piston rod 18 formed integrally with actuating piston 14. The guide piston 17 is of bowl-shaped construction remote from piston 14 and receives a reaction disc 19 consisting of rubber-elastic material.

A control valve 21 which is actuatable by means of a piston rod 20 and a non-illustrated brake pedal is arranged at the end of reinforcement tube 15 close to working chamber 3 and includes a control valve piston 22 which communicates with piston rod 20 and which will open valve openings in a control valve casing 23. Control valve casing 23 is slidably guided in guide bore 16 in such a manner that working chamber 3 will be connected to low-pressure chamber 4 in the non-actuated position shown in FIG. 1. Actuation of control valve 21, i.e. axial displacement of piston rod 20, will interrupt the connection between low-pressure chamber 4 and working chamber 3 and connect working chamber 3 to atmosphere so that movable wall 2 will move towards low-pressure chamber 4.

Control valve casing 23 bears against reaction disc 19 via an annular shoulder 24. Control valve piston 22 extends through control valve casing 23 and bears likewise against reaction disc 19 upon axial displacement thereof.

Reinforcement tube 15 includes two longitudinal slots 25 which lie opposite each other and are open at the end of reinforcement tube 15 close to working chamber 3. Due to the section line I—I in FIG. 2 along which the longitudinal cross-sectional view of FIG. 1 is taken, only one of the two longitudinal slots 25 is shown in FIG. 1. Extending through longitudinal slots 25 are radial ribs 26 connected with control valve casing 23 which are connected to a ring 27 encompassing reinforcement tube 15. Ring 27 is inserted in hub member 6 of movable wall 2 and is fastened therein by a sleeve 28 which is fixed to hub member 6 by punching or indentations 29 of hub member 6. Sleeve 28 includes a cylindrical portion 30. A rolling diaphragm 31 is arranged as a seal between cylindrical portion 30 and reinforcement tube 15. Rolling diaphragm 31 is held in pressure-tight engagement in a groove in ring 27 by means of the collar of a sleeve 28.

Extending through radial ribs 26 and ring 27 are radial air channels 32 which connect the interior of control valve casing 23 via an opening 33 at the periphery of sleeve 28 to low-pressure chamber 4. In the non-activated state of the brake booster, the interior of control valve casing 23 will also be in communication with working chamber 3 via air channels 34 in the area of longitudinal slots 25. Thus, through casing 23 working chamber 3 is connected to low-pressure chamber 4.

At the beginning of an actuation of the brake booster, control valve piston 22 will be displaced axially until a movable control valve body 35, which is urged against control valve piston 22 by means of a compression spring 36, will move into abutment at a sealing surface 37 of control valve casing 23 and thereby interrupt the connection between low-pressure chamber 4 and working chamber 3. When piston rod 20 is moved beyond this pre-operational position of the brake booster, control valve piston 22 will lift from control valve body 35 and will thereby establish a connection of air channels 34 and, thus, working chamber 3, to the chamber 38 encompassing piston rod 20 and sealed to body 35. Chamber 38 is connected to atmosphere via an air intake port 39. This causes development of atmospheric pressure in working chamber 3 resulting in movable wall 2 being moved towards low-pressure chamber 4. Movable wall 2 will drive control valve casing 23 via hub member 6, ring 27 and ribs 26. Control valve casing 23 will exert via reaction disc 19 an axial force as the brake-boosting force on guide piston 17 and thereby on actuating piston 14. This brake-boosting force adds to the direct brake-actuating force, which is likewise transmitted via piston rod 20 and control valve piston 22 onto reaction disc 19.

A compression spring 40, which bears against the transverse casing end wall 9 and against sleeve 28, will return movable wall 2 to its initial position when the brake is released.

Reinforcement tube 15 includes at its end close to working chamber 3, where it is subdivided by longitudinal slots 25, an external thread 41 which is screwed into a groove 42 of screw-on plate 10, whose one inner wall bears an internal thread 43. The opposite inner wall 44 of groove 42 forms a centering surface for the inner side of reinforcement tube 15. Screw-on plate 10 is secured to the non-illustrated splashboard of the automotive vehicle by means of thread bolts 45.

An inner bead 47 of diaphragm 7 is held on hub member 6 of movable wall 2 by a circlip 46. An outer bead 47a of rolling diaphragm 8 is clamped in between the two portions of low-pressure casing 1.

A cylinder chamber 48 disposed between guide piston 17 and master cylinder 12 is via a bore 49 in communication with a port 50 of a non-illustrated brake fluid supply reservoir.

The transverse end wall 9 of low-pressure casing 1 close to low-pressure chamber 4 is fastened to master cylinder 12 by means of an annular detent 51 of end wall 9 which engages an undercut groove 52 at master cylinder 12.

Arranged at the end of reinforcement tube 15 within a central bore of screw-on plate 10 is an axially expandable pleated bellows 53 whose one end is sealingly fastened to the outside of screw-on plate 10, while its other end is sealingly fastened to control valve casing 23. Pleated bellows 53 serves to seal working chamber 3 relative to atmosphere. Because pleated bellows 53 is of small axial length when pushed together as shown in FIG. 1, it contributes to reduce the overall axial length of the brake unit just described.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake booster for automotive vehicles comprising:
  a low-pressure casing having a longitudinal axis and two spaced end walls in a transverse relationship with said axis, said casing being sealingly subdivided into a low-pressure chamber and a working chamber by an axially movable wall disposed coaxial of said axis;
  a reinforcement tube coaxial of said axis extending axially through said casing to interconnect said two end walls and in a slideable sealed relationship with said movable wall, said tube being integrally formed with a housing of a master cylinder having an actuating piston disposed coaxial of said axis and guided in said housing, said housing being secured to that one of said two end walls adjacent said low-pressure chamber;
  a control valve casing disposed in said tube coaxial of said axis, said control valve casing being axially movable in said tube and including therein a mechanically actuatable control valve to connect said working chamber to a selected one of said low-pressure chamber and atmosphere;
  a guide piston disposed in said tube coaxial of said axis connected to said actuating piston, said guide piston being axially movable in said tube;
  an elastic reaction disc disposed in said tube coaxial of said axis between said control valve casing and said guide piston; and
  at least two spaced radial ribs each fastened to said control valve casing extending radially through a different one of at least two longitudinal slots of said tube to connect said control valve casing to said movable wall wherein,
  said guide piston adjacent said control valve casing has a cup-like construction to accommodate said reaction disc, wherein
  each of said two longitudinal slots are open at the end of said tube adjacent said working chamber, and each of said two radial ribs are connected to a ring encompassing said tube and sealingly secured to said movable wall, and wherein the end of said tube adjacent said working chamber is threaded and is in engagement with a thread in that one of said two end walls adjacent said working chamber.

2. A brake booster according to claim 1, wherein the end of said tube adjacent said working chamber extends into an annular groove of that one of said two end walls adjacent said working chamber, said groove having one inner wall containing said thread and an opposite inner wall providing a centering surface for said tube.

3. A brake booster according to claim 2, wherein
that one of said two end walls adjacent said working chamber includes a central screw-on plate having said thread and said groove and an annular casing wall sealingly fastened to said plate.

4. A brake booster according to claim 3, wherein said plate is composed of metal and said annular casing wall is composed of plastic.

5. A brake booster according to claim 3, further including
an axially expandable pleated bellows having one end sealingly connected to said plate and the other end sealingly connected to said control valve casing to seal said work chamber relative to atmosphere.

6. A brake booster according to claim 1, wherein said ring is held by a sleeve in a bowl-shaped hub member of said movable wall, said ring being sealed to said tube by a rolling diaphragm supported by a central portion of said sleeve.

7. A brake booster according to claim 6, wherein
said radial ribs include therein channels to connect said control valve casing to said low-pressure chamber.

8. A brake booster according to claim 1, wherein said radial ribs include therein channels to connect said control valve casing to said low-pressure chamber.

9. A brake booster according to claim 1, wherein that one of said two end walls adjacent said working chamber includes a central screw-on plate and an annular casing wall sealingly fastened to said plate.

10. A brake booster according to claim 9, wherein said plate is composed of metal and said annular casing wall is composed of plastic.

11. A brake booster according to claim 9, further including
an axially expandable pleated bellows having one end sealingly connected to said plate and the other end sealingly connected to said control valve casing to seal said work chamber relative to atmosphere.

12. A brake booster according to claim 1, further including an axially expandable pleated bellows having one end connected to that one of said two end walls adjacent said working chamber and the other end connected to said control valve casing to seal said working chamber relative to atmosphere.

13. A brake booster for automotive vehicles comprising:
a low-pressure casing having a longitudinal axis and two spaced end walls in a transverse relationship with said axis, said casing being sealingly subdivided into a low-pressure chamber and a working chamber by an axially movable wall disposed coaxial of said axis;
a reinforcement tube coaxial of said axis extending axially through said casing to interconnect said two end walls and in a slideable sealed relationship with said movable wall, said tube being integrally formed with a housing of a master cylinder having an actuating piston disposed coaxial of said axis and guided in said housing, said housing being secured to that one of said two end walls adjacent said low-pressure chamber;
a control valve casing disposed in said tube coaxial of said axis, said control valve casing being axially movable in said tube and including therein a mechanically actuatable control valve to connect said working chamber to a selected one of said low-pressure chamber and atmosphere;
a guide piston disposed in said tube coaxial of said axis connected to said actuating piston said guide piston being axially movable in said tube;
an elastic reaction disc disposed in said tube coaxial of said axis between said control valve casing and said guide piston; and
at least two spaced radial ribs each fastened to said control valve casing extending radially through a different one of at least two longitudinal slots of said tube to connect said control valve casing to said movable wall and
wherein that one of said two end walls adjacent said working chamber includes a central screw-on plate and an annular casing wall sealingly fastened to said plate.

14. A brake booster according to claim 13, wherein said plate is composed of metal and said annular casing wall is composed of plastic.

15. A brake booster according to claim 13, wherein
an axially expandable pleated bellows having one end connected to that one of said two end walls adjacent said working chamber and the other end connected to said control valve casing to seal said working chamber relative to atmosphere.

16. A brake booster for automotive vehicles comprising:
a low-pressure casing having a longitudinal axis and two spaced end walls in a transverse relationship with said axis, said casing being sealingly subdivided into a low-pressure chamber and a working chamber by an axially movable wall disposed coaxial of said axis;
a reinforcement tube coaxial of said axis extending axially through said casing to interconnect said two end walls and in a slideable sealed relationship with said movable wall, a master cylinder housing with an actuating piston disposed coaxial of said axis and guided in said housing, said housing being secured to that one of said two end walls adjacent said low-pressure chamber and coupled to said tube,
a control valve casing disposed in said tube coaxial of said axis, said control valve casing being axially movable in said tube and including therein a mechanically actuatable control valve to connect said working chamber to a selected one of said low-pressure chamber and atmosphere;
a guide piston disposed in said tube coaxial of said axis connected to said actuating piston, said guide piston being axially movable in said tube;
at least two spaced radial ribs each fastened to said control valve casing extending radially through a different one of at least two longitudinal slots of said tube to connect said control valve casing to said movable wall and,
wherein
the end of said tube adjacent said working chamber is threaded and is in engagement with a thread in that one of said two end walls adjacent said working chamber.

* * * * *